United States Patent
Schneider et al.

(10) Patent No.: US 12,552,822 B2
(45) Date of Patent: *Feb. 17, 2026

(54) PT-XANTHENE-BROMINE COMPLEX

(71) Applicant: EVONIK OPERATIONS GMBH, Essen (DE)

(72) Inventors: Carolin Schneider, Monheim am Rhein (DE); Ralf Jackstell, Rostock (DE); Matthias Beller, Ostseebad Nienhagen (DE); Robert Franke, Marl (DE)

(73) Assignee: EVONIK OXENO GMBH & CO. KG, Marl (DE)

( * ) Notice: Subject to any disclaimer, the term of this patent is extended or adjusted under 35 U.S.C. 154(b) by 520 days.

This patent is subject to a terminal disclaimer.

(21) Appl. No.: 18/064,947

(22) Filed: Dec. 13, 2022

(65) Prior Publication Data

US 2023/0192740 A1    Jun. 22, 2023

(30) Foreign Application Priority Data

Dec. 17, 2021 (EP) .................................. 21215353

(51) Int. Cl.
C07F 15/00 (2006.01)
(52) U.S. Cl.
CPC ................. C07F 15/0086 (2013.01)
(58) Field of Classification Search
CPC . C07F 15/0086; C07F 15/0093; C07F 9/5022
See application file for complete search history.

(56) References Cited

U.S. PATENT DOCUMENTS

| | | | | |
|---|---|---|---|---|
| 3,981,925 | A * | 9/1976 | Schwager | B01J 31/185 502/169 |
| 8,173,830 | B2 | 5/2012 | Kimmich et al. | |
| 8,536,367 | B2 | 9/2013 | Kimmich et al. | |
| 11,712,688 | B2 | 8/2023 | Yang et al. | |
| 11,739,042 | B2 * | 8/2023 | Schneider | B01J 37/04 568/454 |
| 11,866,399 | B2 * | 1/2024 | Schneider | B01J 27/13 |
| 11,912,726 | B2 * | 2/2024 | Schneider | C07C 45/00 |
| 2008/0039625 | A1 * | 2/2008 | Lautens | C07C 205/58 548/510 |
| 2023/0191384 | A1 | 6/2023 | Schneider et al. | |
| 2023/0191385 | A1 | 6/2023 | Schneider et al. | |
| 2023/0192581 | A1 | 6/2023 | Schneider et al. | |
| 2023/0192582 | A1 | 6/2023 | Schneider et al. | |
| 2023/0192583 | A1 | 6/2023 | Schneider et al. | |
| 2023/0192584 | A1 | 6/2023 | Schneider et al. | |
| 2023/0192741 | A1 | 6/2023 | Schneider et al. | |
| 2023/0192742 | A1 | 6/2023 | Schneider et al. | |
| 2023/0192743 | A1 | 6/2023 | Schneider et al. | |

FOREIGN PATENT DOCUMENTS

| | | |
|---|---|---|
| CN | 102414162 A | 4/2012 |
| CN | 109806911 A | 5/2019 |
| CN | 113461737 A | 10/2021 |
| GB | 1 368 434 | 9/1974 |
| JP | S53-50102 A | 5/1978 |

OTHER PUBLICATIONS

G. Petöcz et al., 689 Journal of Organometallic Chemistry, 1188-1193 (2004) (Year: 2004).*
C. Botteghi et al., 200 Journal of Molecular Catalysis A: Chemical, 147-156 (2003) (Year: 2003).*
C. Foca et al., 27 New Journal of Chemistry, 533-539 (2003) (Year: 2003).*
L. van der Veen et al., J. Chem. Soc. Dalton Trans. , 2105-2112 (2000) (Year: 2000).*
First Office Action mailed Aug. 12, 2024 for Chinese Patent Application No. 202211612193.7 (3 pages in Chinese; 5 pages English translation; 3 pages search report).
Denes Konya et al. Highly Selective Halide Anion-Promoted Palladium-Catalyzed Hydroformylation of Internal Alkenes to Linear Alcohols. Organometallics. 2006. vol 25, pp. 3166-3174.
Botteghi. C. et al. Synthesis of 2-chromanol by hydroformylation of 2-hydroxystyrene derivatives. Journal of Molecular Catalysis A: Chemical 200. 2003. pp. 147-156.
U.S. Appl. No. 18/064,945, filed Dec. 13, 2022, Schneider et al.
U.S. Appl. No. 18/064,946, filed Dec. 13, 2022, Schneider et al.
U.S. Appl. No. 18/064,948, filed Dec. 13, 2022, Schneider et al.
U.S. Appl. No. 18/064,949, filed Dec. 13, 2022, Schneider et al.
U.S. Appl. No. 18/064,950, filed Dec. 13, 2022, Schneider et al.
U.S. Appl. No. 18/064,952, filed Dec. 13, 2022, Schneider et al.
U.S. Appl. No. 18/064,953, filed Dec. 13, 2022, Schneider et al.
U.S. Appl. No. 18/064,955, filed Dec. 13, 2022, Schneider et al.
U.S. Appl. No. 18/064,958, filed Dec. 13, 2022, Schneider et al.
European Search Report dated May 30, 2022 for European Patent Application No. 21215353.0 (7 pages in German with Machine Translation).
Petöcz, G., et al. Xantphos as cis- and trans-chelating ligand in square-planar platinum(II) complexes. Hydroformylation of styrene with platinum-xantphos-tin(II)chloride system. Journal of Organometallic Chemistry. 2004. vol. 689, No. 7, pp. 1188-1193.
Foca, Cláudia M., et al. Hydroformylation of Myrcene: metal and ligand effects in the hydroformylation of conjugated dienes. New J. Chem. 2003. vol. 27, pp. 533-539.
Kranenburg, Mirko, et al. The Effect of the Bite Angle of Diphosphane Ligands on Activity and Selectivity in Palladium-Catalyzed Cross-Coupling. 1998 Euro J. Inorg. Chem. pp. 155-157.
Zhang, Yang, et al. Binuclear Pd(I)-Pd(I) Catalysis Assisted by Iodide Ligands for Selective Hydroformylation of Alkenes and Alkynes. J. Am. Chem. Soc. 2020. vol. 142, pp. 18251-18265.
Meessen, Patric, et al. Highly regioselective hydroformylation of internal, functionalzed olefins applying Pt*Sn complexes with large bite angle diphosphines. Journal of Organometallic Chemistry. 1998. vol. 551, pp. 165-170.
Search Report mailed Aug. 23, 2024 in Singapore Patent Application No. 10202260344P (2 pages).

* cited by examiner

*Primary Examiner* — Alexander R Pagano
(74) *Attorney, Agent, or Firm* — Smith, Gambrell & Russell, LLP

(57) ABSTRACT

Pt-xanthene-bromine complex, and use thereof for catalysis of a hydroformylation reaction.

11 Claims, No Drawings

PT-XANTHENE-BROMINE COMPLEX

The present invention relates to a Pt-xanthene-bromine complex, and the use thereof for catalysis of a hydroformylation reaction.

C. Botteghi et al., Journal of Molecular Catalysis A: Chemical 200, (2003), 147-156 describes the use of Pt(Xantphos)Cl$_2$ for hydroformylation of 2-tosyloxystyrene.

The problem addressed by the present invention is that of providing a novel complex. The complex here is to afford an enhanced yield in the catalysis of hydroformylation reactions compared to the Pt(Xantphos)Cl$_2$ complex described in the prior art.

This object is achieved by a complex according to claim 1.

Complex comprising:
a) Pt;
b) a ligand conforming to the formula (I):

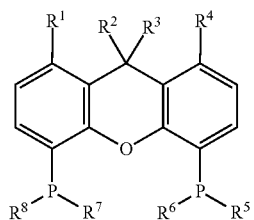

where $R^1$, $R^2$, $R^3$, $R^4$, $R^5$, $R^6$, $R^7$, $R^8$ are selected from: —H, —($C_1$-$C_{12}$)-alkyl, —($C_6$-$C_{20}$)-aryl; and, if $R^1$, $R^2$, $R^3$, $R^4$, $R^5$, $R^6$, $R^7$, $R^8$ are —($C_6$-$C_{20}$)-aryl, the aryl ring may have substituents selected from: —($C_1$-$C_{12}$)-alkyl, —O—($C_1$-$C_{12}$)-alkyl;

c) a bromine ligand.

The expression ($C_1$-$C_{12}$)-alkyl encompasses straight-chain and branched alkyl groups having 1 to 12 carbon atoms. These are preferably ($C_1$-$C_8$)-alkyl groups, more preferably ($C_1$-$C_6$)-alkyl, most preferably ($C_1$-$C_4$)-alkyl.

Suitable ($C_1$-$C_{12}$)-alkyl groups are especially methyl, ethyl, propyl, isopropyl, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,1-dimethylbutyl, 1,2-dimethylbutyl, 2,2-dimethylbutyl, 1,3-dimethylbutyl, 2,3-dimethylbutyl, 3,3-dimethylbutyl, 1,1,2-trimethylpropyl, 1,2,2-trimethylpropyl, 1-ethylbutyl, 1-ethyl-2-methylpropyl, n-heptyl, 2-heptyl, 3-heptyl, 2-ethylpentyl, 1-propylbutyl, n-octyl, 2-ethylhexyl, 2-propylheptyl, nonyl, decyl.

The expression ($C_6$-$C_{20}$)-aryl encompasses mono- or polycyclic aromatic hydrocarbyl radicals having 6 to 20 carbon atoms. These are preferably ($C_6$-$C_{14}$)-aryl, more preferably ($C_6$-$C_{10}$)-aryl.

Suitable ($C_6$-$C_{20}$)-aryl groups are especially phenyl, naphthyl, indenyl, fluorenyl, anthracenyl, phenanthrenyl, naphthacenyl, chrysenyl, pyrenyl, coronenyl. Preferred ($C_6$-$C_{20}$)-aryl groups are phenyl, naphthyl and anthracenyl.

In one embodiment, $R^2$, $R^3$, $R^5$, $R^6$, $R^7$, $R^8$ are selected from: —($C_1$-$C_{12}$)-alkyl, —($C_6$-$C_{20}$)-aryl.
In one embodiment, $R^5$, $R^6$, $R^7$, $R^8$ are —($C_6$-$C_{20}$)-aryl.
In one embodiment, $R^5$, $R^6$, $R^7$, $R^8$ are -Ph.
In one embodiment, $R^2$ and $R^3$ are —($C_1$-$C_{12}$)-alkyl.
In one embodiment, $R^2$ and $R^3$ are —CH$_3$.
In one embodiment, $R^1$ and $R^4$ are —H.

In one embodiment, the ligand conforming to the formula (I) has the structure (1):

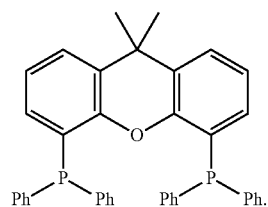

(1): Xantphos

In one embodiment, the complex has exactly one ligand corresponding to formula (I).

In one embodiment, the complex has at least two bromine ligands.

In one embodiment, the complex has exactly two bromine ligands.

In one embodiment, the complex has the following structure: Pt(Xantphos)Br$_2$.

As well as the complex per se, the use thereof for catalysis of a hydroformylation reaction is also claimed.

Use of a complex as described above for catalysis of a hydroformylation reaction.

The invention shall be elucidated in more detail hereinbelow with reference to working examples.

EXPERIMENTAL DESCRIPTION

A vial was charged with PtX$_2$ (X=halogen), ligand, and an oven-dried stirrer bar. The vial is then sealed with a septum (PTFE-coated styrene-butadiene rubber) and phenolic resin cap. The vial is evacuated and refilled with argon three times. Toluene and olefin were added to the vial using a syringe. The vial was placed in an alloy plate, which was transferred to an autoclave of the 4560 series from Parr Instruments under an argon atmosphere. After purging the autoclave three times with CO/H$_2$, the synthesis gas pressure was increased to 40 bar at room temperature. The reaction was conducted at 120° C. for 20 h/18 h. On termination of the reaction, the autoclave was cooled to room temperature and cautiously decompressed. Yield and selectivity were determined by GC analysis.

Hydroformylation of 1-Octene

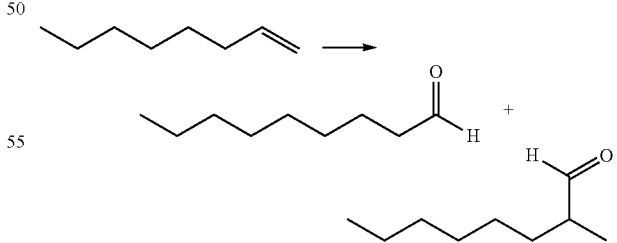

Reaction Conditions:
20 mmol of 1-octene, 1.0 mol % of Pt, 2.2 equivalents of Xantphos (1), solvent: toluene, p(CO/H$_2$): 40 bar, T: 120° C., t: 20 h.

Yields:
PtBr$_2$: 99%
PtCl$_2$: 30%

Variation of the Halogen (2-Octene)

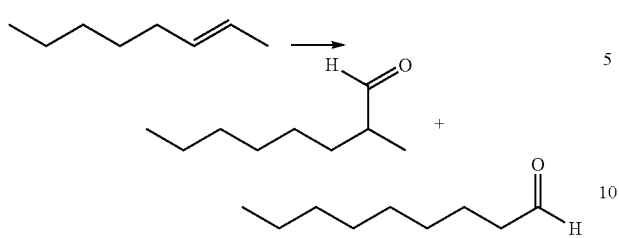

Reaction Conditions:
20 mmol of 2-octene, 1.0 mol % of Pt, 1.1 equivalents of Xantphos (1), solvent: toluene, p(CO/H$_2$): 40 bar, T: 120° C., t: 20 h.
Yields:
PtBr$_2$: 99%
PtCl$_2$: 16%

Variation of the Halogen (1-Octene)
Reaction Conditions:
10.0 mmol of 1-octene, 0.1 mol % PtX$_2$, 2.2 equivalents of ligand, solvent: toluene, p(CO/H$_2$): 40 bar, T: 120° C., t: 20 h.
Yields:

| Ligand | Halogen | Yield [%] |
|---|---|---|
| (1) 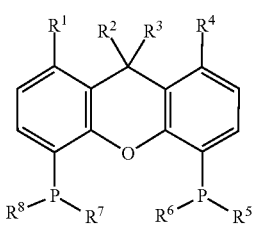 | Br/Cl | 97/5 |

Variation of the Ligand and of the Halogen
Reaction Conditions:
1.0 mmol of 2-octene, 0.5 mol % PtX$_2$, 2.0 equivalents of ligand, solvent: toluene, p(CO/H$_2$): 40 bar, T: 120° C., t: 18 h.
Yields:

| Ligand | Halogen | Yield [%] |
|---|---|---|
| (1) | Br/Cl | 85/<1 |
| 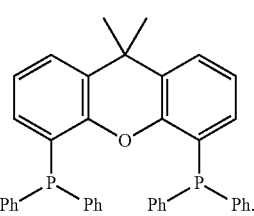 | Br/Cl | 81/<1 |

Variation of the Equivalents and of the Halogen
Reaction Conditions:
1.0 mmol of 1-octene, 1.0 mol % Pt(acac)$_2$, LiX (X=halogen), 2.2 equivalents of Xantphos (1), solvent: toluene, p(CO/H$_2$): 40 bar, T: 120° C., t: 20 h.

| Equivalents of LiX | X | Yield [%] |
|---|---|---|
| 0.5 | Br | 68 |
| 2.0 | Br | 71 |
| 1.5 | Cl | 0 |
| 4.0 | Cl | 0 |

As the experimental results show, the object is achieved by the complex according to the invention.

The invention claimed is:

1. Complex comprising:
   a) Pt;
   b) a ligand conforming to the formula (I):

$$\text{(I)}$$

where $R^1$, $R^2$, $R^3$, $R^4$, $R^5$, $R^6$, $R^7$, $R^8$ are selected from:
—H, —(C$_1$-C$_{12}$)-alkyl, —(C$_6$-C$_{20}$)-aryl;
and, if $R^1$, $R^2$, $R^3$, $R^4$, $R^5$, $R^6$, $R^7$, $R^8$ are —(C$_6$-C$_{20}$)-aryl, the aryl ring may have substituents selected from:
—(C$_1$-C$_{12}$)-alkyl, —O—(C$_1$-C$_{12}$)-alkyl;
   c) a bromine ligand.

2. Complex according to claim 1, where $R^2$, $R^3$, $R^5$, $R^6$, $R^7$, $R^8$ are selected from: —(C$_1$-C$_{12}$)-alkyl, —(C$_6$-C$_{20}$)-aryl.

3. Complex according to claim 1, where $R^5$, $R^6$, $R^7$, $R^8$ are —(C$_6$-C$_{20}$)-aryl.

4. Complex according to claim 1, where $R^2$ and $R^3$ are —(C$_1$-C$_{12}$)-alkyl.

5. Complex according to claim 1, where $R^1$ and $R^4$ are —H.

6. Complex according to claim 1, wherein the ligand conforming to the formula (I) has the structure (1):

$$(1)$$

7. Complex according to claim 1, wherein the complex has exactly one ligand conforming to the formula (I).

8. Complex according to claim 1, wherein the complex has at least two bromine ligands.

9. Complex according to claim 1,
wherein the complex has exactly two bromine ligands.

10. Complex according to claim 1,
wherein the complex has the following structure: Pt(Xantphos)Br$_2$.

11. In a process for hydroformylation comprising contacting a hydroformylation substrate with a catalyst wherein the improvement comprises contacting the complex according to claim 1 with the hydroformylation substrate for catalysis of the hydroformylation.

* * * * *